(12) United States Patent
Wang

(10) Patent No.: US 8,388,397 B2
(45) Date of Patent: Mar. 5, 2013

(54) LIQUID CRYSTAL CELL MANUFACTURING DEVICE AND METHOD THEREOF

(75) Inventor: Yun Wang, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 12/997,896

(22) PCT Filed: Nov. 22, 2010

(86) PCT No.: PCT/CN2010/078975
§ 371 (c)(1),
(2), (4) Date: Dec. 14, 2010

(87) PCT Pub. No.: WO2012/040962
PCT Pub. Date: Apr. 5, 2012

(65) Prior Publication Data
US 2012/0196499 A1    Aug. 2, 2012

(30) Foreign Application Priority Data

Sep. 30, 2010   (CN) .......................... 2010 1 0505974

(51) Int. Cl.
*H01J 9/00*       (2006.01)
*H01J 37/32*      (2006.01)
(52) U.S. Cl. ..................... 445/23; 156/345.31; 156/916; 118/715; 118/719

(58) Field of Classification Search .............. 445/23–25; 156/345.31, 916; 118/715, 719
See application file for complete search history.

(56) References Cited

U.S. PATENT DOCUMENTS
5,084,125 A    1/1992 Aoi

FOREIGN PATENT DOCUMENTS

| | | |
|---|---|---|
| CN | 2801298 Y | 8/2006 |
| CN | 1936678 A | 3/2007 |
| CN | 201460336 U | 5/2010 |
| JP | 2003005197 A | 1/2003 |
| JP | 2007241152 A | 9/2007 |

*Primary Examiner* — Joseph L Williams
(74) *Attorney, Agent, or Firm* — Harness, Dickey & Pierce, PLC

(57) ABSTRACT

The present invention provides a liquid crystal cell manufacturing device and a method thereof. The liquid crystal cell manufacturing device includes a pre-alignment vacuum chamber, a vacuum lamination chamber and a sealant curing chamber. The pre-alignment vacuum chamber includes a comb-type transferring system for aligning a first substrate with a second substrate and sending them into the vacuum lamination chamber. The vacuum lamination chamber uses a lamination device to laminate the first substrate and the second substrate into a substrate assembly under a nearly vacuum status, and then uses a transferring device to send the substrate assembly to the sealant curing chamber. The sealant curing chamber uses at least one UV spot light source to move above the substrate assembly and irradiate a surface of the substrate assembly to cure at least one sealant in the substrate assembly, and thereby complete manufacture of liquid crystal cells of liquid crystal panels.

20 Claims, 5 Drawing Sheets

LIQUID CRYSTAL CELL MANUFACTURING DEVICE AND METHOD THEREOF

FIELD OF THE INVENTION

The present invention relates to a liquid crystal cell manufacturing device and a method thereof, and more particularly to a liquid crystal cell manufacturing device and a method thereof that integrate devices of substrate alignment, vacuum lamination and sealant curing into one unit.

BACKGROUND OF THE INVENTION

In the present manufacture process of One Drop Filling (ODF) for liquid crystal panel, related apparatuses includes a sealant dispensing apparatus, a liquid crystal filling apparatus, a vacuum lamination apparatus and a sealant curing apparatus. After processes of sealant dispensing and liquid crystal filling, a thin-film-transistor (TFT) substrate and a color filter (CF) substrate will be processed with a vacuum lamination process, and then sealant for sealing the liquid crystal will be cured after the vacuum lamination process, so as to finish a cell manufacturing process for liquid crystal cells.

The present processes of vacuum lamination and sealant curing for liquid crystal panel relate to a vacuum lamination apparatus, a sealant curing apparatus and robot arms for transferring substrates in the manufacturing processes. The thin-film-transistor substrate and the color filter substrate will be sent to the vacuum lamination apparatus by the robot arms, and then with operations of alignment and air pumping, wherein both of them then will be laminated to form a substrate assembly in vacuum status. The time that a present vacuum lamination apparatus costs on performing vacuum lamination is about 100 seconds. Since the time that the vacuum lamination apparatus costs on feeding in the substrates is about 30 seconds. Besides, air pumping from normal-pressure status to vacuum status of 0.2 Pa usually needs 35 to 45 seconds, thus it can be seen from this that the process of vacuum lamination mainly take time on actions of substrate moving in and air pumping.

After finishing the process of vacuum lamination, the substrate assembly then returns to a normal-pressure status and is transferred to the sealant curing apparatus by the robot arms. Generally speaking, the transferring time is 1 to 2 minutes. Sealant in the substrate assembly needs to finish curing in a certain time after returning to the normal-pressure status (normally 5 to 10 minutes), otherwise, the sealant which is not fully cured will be impacted by external air pressure to thus cause liquid crystal to leak out. Meanwhile, the sealant which is not fully cured also easily leads to alignment deviation of both of the substrates and affects the quality of manufacturing. Hence, time management for transferring into the sealant curing apparatus and processing sealant curing is strictly demanded.

Furthermore, with the increase of size of liquid crystal panel, the sealant curing apparatus is using ultraviolet lamps having larger power to ensure irradiation area and uniformity of ultraviolet light, and also the number of lamps is increased. Because the lamps are high-priced and require a large amount of electricity and cooling devices; and simultaneously still need to be used with masks to ensure safety of products, so that equipment cost for conventional sealant curing apparatus is quite considerable.

Hence, it is necessary to provide a liquid crystal cell manufacturing device and a method thereof to overcome the problems existing in the conventional technology.

SUMMARY OF THE INVENTION

A primary object of the invention is to provide a liquid crystal cell manufacturing device that integrates processes of vacuum lamination, sealant curing and etc. operated with improved transferring systems, so as to reduce manufacture time, lower risk of leakage of liquid crystal and reduce equipment cost.

A secondary object of the present invention is to provide a liquid crystal cell manufacturing method which uses a liquid crystal cell manufacturing device that integrates processes of vacuum lamination, sealant curing and etc. with improved transferring systems to perform manufacture of liquid crystal cells.

To achieve the above object, the present invention provides a liquid crystal cell manufacturing device which comprises:

a pre-alignment vacuum chamber receiving a first substrate and a second substrate waiting to be laminated, and lowering an internal pressure to a first predetermined value after receiving the first substrate and the second substrate, wherein the pre-alignment vacuum chamber has a comb-type transferring system, and the comb-type transferring system transfers the first substrate and the second substrate and maintains position alignment between the first substrate and the second substrate, simultaneously;

a vacuum lamination chamber communicated with the pre-alignment vacuum chamber to receive the first substrate and the second substrate transferred from the pre-alignment vacuum chamber by the comb-type transferring system, lowering the internal pressure from the first predetermined value to a second predetermined value closer to a vacuum status and having a lamination device and a transferring device, wherein the lamination device laminates the first substrate and the second substrate together into a substrate assembly, and the transferring device carries and transfers the substrate assembly; and a sealant curing chamber communicated with the vacuum lamination chamber to receive the substrate assembly transferred from the vacuum lamination chamber by the transferring device, so as to cure at least one sealant in the substrate assembly.

In one embodiment of the present invention, the sealant curing chamber includes at least one UV spot light source, and the at least one UV spot light source is disposed on a top of the sealant curing chamber to move above the substrate assembly and irradiate a surface of the substrate assembly, so as to cure the at least one sealant.

In one embodiment of the present invention, the comb-type transferring system includes a first transferring mechanism and a second transferring mechanism, wherein the first transferring mechanism is disposed on a top of the pre-alignment vacuum chamber and has at least two first suction-bar assemblies, wherein each of the at least two first suction-bar assemblies is constructed by a plurality of suction bars, and the suction bars of one of the first suction-bar assemblies and the suction bars of the other of the first suction-bar assemblies are arranged alternately in parallel at intervals; and the second transferring mechanism is disposed on a bottom of the pre-alignment vacuum chamber and corresponds to the first transferring mechanism; the second transferring mechanism has at least two second suction-bar assemblies, wherein each of the at least two second suction-bar assemblies is constructed by a plurality of suction bars, and the suction bars of one of the second suction-bar assemblies and the suction bars of the other of the second suction-bar assemblies are arranged alternately in parallel at intervals.

In one embodiment of the present invention, each of the suction bars has holes formed on two ends thereof, respectively, and has a slot formed on a bottom surface thereof and communicated with the holes, and each of the holes is connected to a suction-pipe.

In one embodiment of the present invention, the first predetermined value of the lowered pressure is 1 Pa, and the second predetermined value thereof is 0.2 Pa.

In one embodiment of the present invention, the at least one UV spot light source moves with respect to the position of the at least one sealant of the substrate assembly.

In one embodiment of the present invention, a width of an irradiation area of the at least one UV spot light source irradiating on the substrate assembly is equal to a width of the sealant.

In one embodiment of the present invention, a width of the sealant is ranged between 0.5 mm and 2 mm.

In one embodiment of the present invention, a vacuum barrier system is mounted between the vacuum lamination chamber and the pre-alignment vacuum chamber, and the vacuum barrier system lowers the pressure from the first predetermined value to the second predetermined value in the vacuum lamination chamber, so as to cut off the communication between the vacuum lamination chamber and the pre-alignment vacuum chamber, so that the vacuum lamination chamber forms an enclosed space.

In one embodiment of the present invention, the sealant curing chamber comprises a plurality of UV spot light sources arranged side by side that move along an identical moving path to irradiate the same sealant, wherein a shape of the moving path is corresponding to a shape of the sealant.

In one embodiment of the present invention, the transferring device is a roller-type transferring device.

Moreover, the present invention further provides a liquid crystal cell manufacturing method which comprises steps of: firstly providing a pre-alignment vacuum chamber, a vacuum lamination chamber and a sealant curing chamber, wherein the pre-alignment vacuum chamber includes a comb-type transferring system, the vacuum lamination chamber includes a lamination device and a transferring device, and the sealant curing chamber includes at least one UV spot light source, and the liquid crystal cell manufacturing method further comprises steps of: sending a first substrate and a second substrate waiting to be laminated into the pre-alignment vacuum chamber; using the comb-type transferring system of the pre-alignment vacuum chamber to align the first substrate with the second substrate; lowering an internal pressure to a first predetermined value in the pre-alignment vacuum chamber in advance; using the comb-type transferring system to transfer the first substrate and the second substrate into the vacuum lamination chamber; lowering the internal pressure from the first predetermined value to a second predetermined value that is closer to a vacuum status in the vacuum lamination chamber; using the lamination device in the vacuum lamination chamber to laminate the first substrate and the second substrate together into a substrate assembly; using the transferring device in the vacuum lamination chamber to transfer the substrate assembly into the sealant curing chamber; and curing at least one sealant of the substrate assembly in the sealant curing chamber.

In one embodiment of the present invention, the sealant curing chamber uses at least one UV spot light source to move above the substrate assembly and irradiate a surface of the substrate assembly, so as to cure the at least one sealant of the substrate assembly.

In one embodiment of the present invention, the comb-type transferring system includes a first transferring mechanism and a second transferring mechanism, wherein the first transferring mechanism is disposed on a top of the pre-alignment vacuum chamber and has at least two first suction-bar assemblies, wherein each of the at least two first suction-bar assemblies is constructed by a plurality of suction bars, and the suction bars of one of the first suction-bar assemblies and the suction bars of the other of the first suction-bar assemblies are arranged alternately in parallel at intervals; and the second transferring mechanism is disposed on a bottom of the pre-alignment vacuum chamber, corresponds to the first transferring mechanism and has at least two second suction-bar assemblies, wherein each of the at least two second suction-bar assemblies is constructed by a plurality of suction bars, and the suction bars of one of the second suction-bar assemblies and the suction bars of the other of the second suction-bar assemblies are arranged alternately in parallel at intervals.

In one embodiment of the present invention, each of the suction bars has holes formed on two ends thereof, respectively, and has a slot formed on a bottom surface thereof and communicated with the holes, and each of the holes is connected to a suction-pipe.

In one embodiment of the present invention, a width of the sealant is ranged between 0.5 mm and 2 mm.

In one embodiment of the present invention, the at least one UV spot light source moves with respect to the position of the at least one sealant of the substrate assembly, and a width of an irradiation area of the least one UV spot light source irradiating on the substrate assembly is equal to a width of the sealant.

In one embodiment of the present invention, a width of the sealant is ranged between 0.5 mm and 2 mm.

In one embodiment of the present invention, the transferring device is concealed in a bottom of the vacuum lamination chamber, and is raised to a predetermined position after the first substrate and the second substrate are laminated into the substrate assembly and the pressure is released to the normal pressure, so as to carry and transfer the substrate assembly.

Moreover, the present invention further provides a liquid crystal cell manufacturing device which comprises:

a vacuum lamination chamber receiving a first substrate and a second substrate, lowering an internal pressure to a second predetermined value close to a vacuum status and having a lamination device and a roller-type transferring device, wherein the lamination device laminates the first substrate and the second substrate together into a substrate assembly and the roller-type transferring device carries and transfers the substrate assembly; and a sealant curing chamber communicated with the vacuum lamination chamber to receive the substrate assembly transferred from the vacuum lamination chamber by the roller-type transferring device and having at least one UV spot light source, wherein the at least one UV spot light source is disposed on a top of the sealant curing chamber to move above the substrate assembly and irradiate a surface of the substrate assembly, so as to cure at least one sealant of the substrate assembly.

DETAILED DESCRIPTION OF THE PREFERRED EMBODIMENTS

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Figure 1:
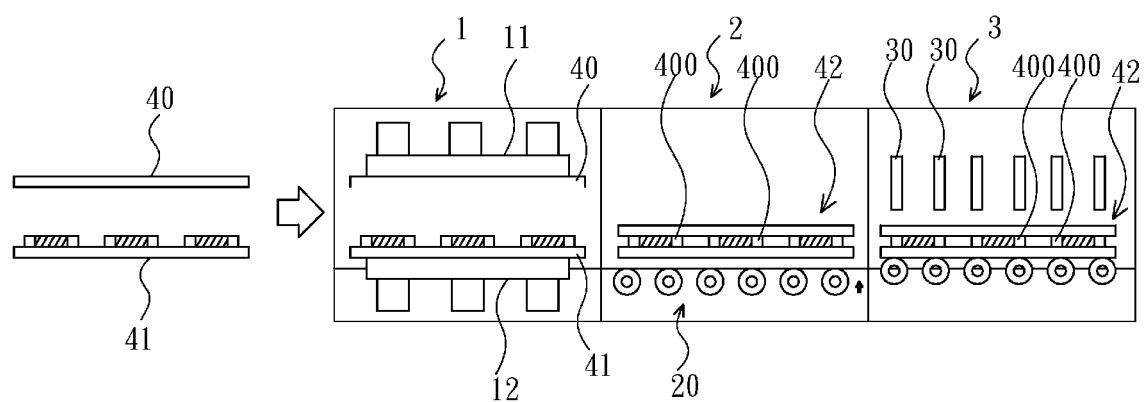
FIG. 1 is a schematic view of a liquid crystal cell manufacturing device according to a preferred embodiment of the present invention.

With reference to FIG. 1, FIG. 1 is a schematic view of a liquid crystal cell manufacturing device according to a preferred embodiment of the present invention, wherein the liquid crystal cell manufacturing device mainly comprises a pre-alignment vacuum chamber 1, a vacuum lamination chamber 2 and a sealant curing chamber 3.

Figure 2:
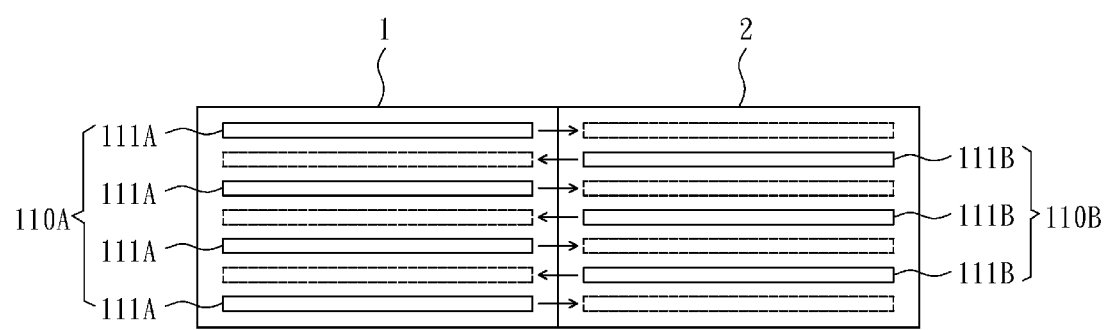
FIG. 2 is a planar schematic view of a first transferring mechanism of a comb-type transferring system of the liquid crystal cell manufacturing device according to a preferred embodiment of the present invention.
Figure 3:
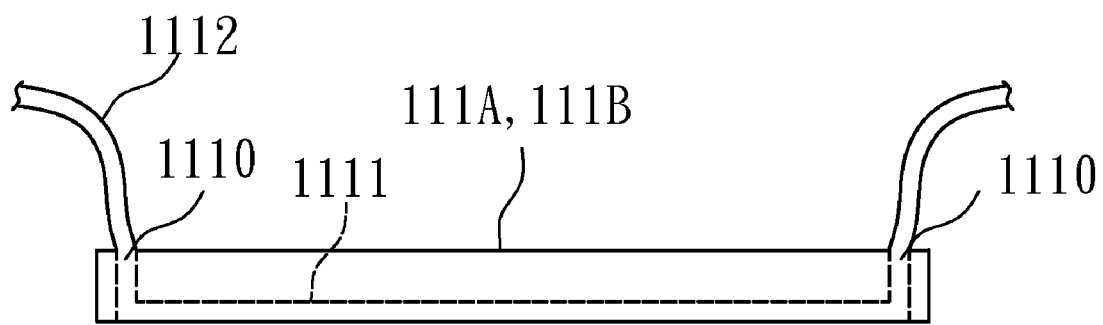
FIG. 3 is a side view of a preferred embodiment of suction bars of the first transferring mechanism in FIG. 2.

The pre-alignment vacuum chamber 1 receives a first substrate 40 and a second substrate 41 waiting to be laminated together. The pre-alignment vacuum chamber 1 transfers the first substrate 40 and the second substrate 41. and maintains the first substrate 40 and the second substrate 41 to be corresponding to each other in position, simultaneously. The pre-alignment vacuum chamber 1 lowers an internal pressure to a first predetermined value after receiving the first substrate 40 and the second substrate 41. The first predetermined value is close to a vacuum status and is preferably 1 Pa. The pre-alignment vacuum chamber 1 has a first transferring mechanism 11 and a second transferring mechanism 12, both of which are collectively called a comb-type transferring system. The first transferring mechanism 11 is disposed on a top of the pre-alignment vacuum chamber 1 for transferring the first substrate 40 that is waiting to be laminated. With reference to FIG. 2, the first transferring mechanism 11 has at least two first suction-bar assemblies 110A, 110B, wherein the at least two first suction-bar assemblies 110A, 110B alternately move back and forth to transfer a plurality of the first substrates 40. In detail, each of the first suction-bar assemblies 110A, 110B is constructed by a plurality of suction bars 111A, 111B, and the suction bars 111A of the first suction-bar assembly 110A and the suction bars 111B of another first suction-bar assembly 110B are arranged alternately in parallel at intervals, hence the at least two first suction-bar assemblies 110A, 110B can move back and forth without affecting each other and use suction forces to stably transfer the first substrate 40 waiting to be laminated. With reference to FIG. 3, each of the suction bars 111A, 111B has holes 1110 formed on two ends thereof, respectively, and has a slot 1111 formed on a bottom surface thereof and communicated with the holes 1110, and each of the holes 1110 is connected to a suction-pipe 1112. When the bottom surfaces of the suction bars 111A, 111B contact a top surface of the first substrate 40, the suction bars 111A, 111B use the suction-pipes 1112 to pump air to form a vacuum suction force in the slot 1111, so that the suction bars 111A, 111B can be tightly and stably attached with the first substrate 40. After that, the suction bars 111A, 111B can be controlled to move for transferring the first substrate 40.

The second transferring mechanism 12 is disposed on a bottom of the pre-alignment vacuum chamber 1 and corresponding to the first transferring mechanism 12. The second transferring mechanism 12 transfers the second substrate 41 waiting to be laminated. With respect to the structure of the first transferring mechanism 11, the second transferring mechanism 12 has at least two second suction-bar assemblies, wherein the at least two second suction-bar assemblies alternately move back and forth to transfer a plurality of the second substrates 41. In more detail, each of the second suction-bar assemblies is constructed by a plurality of suction bars, and the suction bars 111A of the second suction-bar assembly and the suction bars of another second suction-bar assembly are arranged alternately in parallel at intervals, hence the at least two second suction-bar assemblies can move back and forth without affecting each other and use suction forces to stably transfer the second substrate 41 waiting to be laminated.

The vacuum lamination chamber 2 is communicated with the pre-alignment vacuum chamber 1 to receive the first substrate 40 and the second substrate 41 transferred from the pre-alignment vacuum chamber 1, lowers the internal pressure from the first predetermined value to a second predetermined value closer to a vacuum status, and the second predetermined value is preferably 0.2 Pa. The vacuum lamination chamber 2 further has a lamination device (not shown in figures) that laminates the first substrate 40 and the second substrate 41, and the first substrate 40 and the second substrate 41 become a substrate assembly 42 after lamination, wherein the substrate assembly 42 has at least one sealant 400, and the sealant 400 is disposed between the first substrate 40 and the second substrate 41. The sealant 400 is for sealing the pre-filled liquid crystal, and the sealant 400 is usually selected from UV-cured seal. Since the present sealant is still half-solid and has stickiness, therefore the sealant can be use to bond the first substrate 40 and the second substrate 41 therebetween after lamination. A width of the sealant 400 is ranged between 0.5 mm and 2 mm. The vacuum lamination chamber 2 further releases the internal pressure to normal-pressure status after the first substrate 40 and the second substrate 41 are laminated. The vacuum lamination chamber 2 and the pre-alignment vacuum chamber 1 have a vacuum barrier system mounted therebetween (not shown in figures). The vacuum barrier system can lower the pressure from 1 Pa to 0.2 Pa in the vacuum lamination chamber 2 for cutting off the communication between the vacuum lamination chamber 2 and the pre-alignment vacuum chamber 1. The vacuum lamination chamber 2 then accordingly forms an enclosed space. Moreover, the vacuum lamination chamber 2 further includes a transferring device 20. The transferring device 20 is concealed in a bottom of the vacuum lamination chamber 2, and is raised to a predetermined position after the first substrate 40 and the second substrate 41 are laminated into the substrate assembly 42 and the pressure is released to the normal pressure, so as to carry and transfer the substrate assembly 42. The transferring device is preferably a roller-type transferring device.

Figure 4:
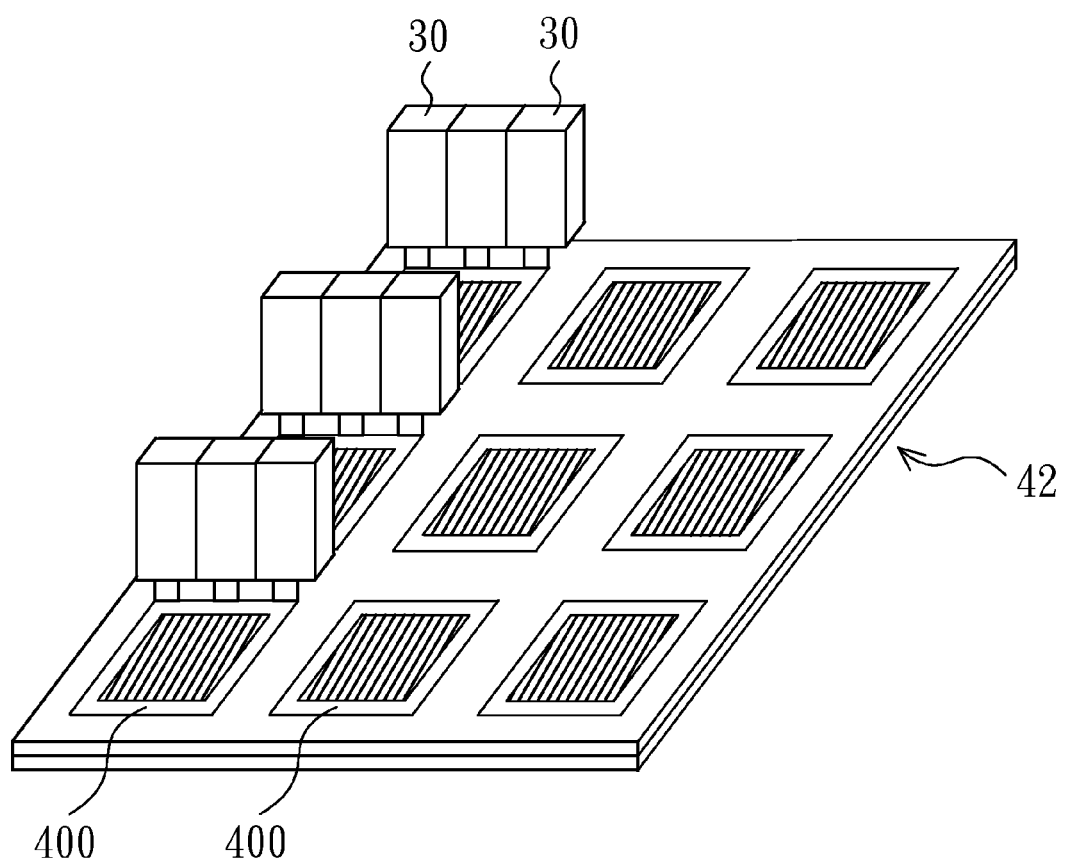
FIG. 4 is an operational view of UV spot light sources of a sealant curing chamber of the liquid crystal cell manufacturing device that irradiates a substrate assembly according to a preferred embodiment of the present invention.

The sealant curing chamber 3 communicates with the vacuum lamination chamber 2 to receive the substrate assembly 42 transferred from the vacuum lamination chamber 33. The sealant curing chamber 3 has at least one UV spot light source 30 disposed on a top of the sealant curing chamber 3. With further reference to FIG. 4, the at least one UV spot light source 30 is a specific movable-type light source which moves above the substrate assembly 42 and irradiate a surface of the substrate assembly 42. By that means, the at least one UV spot light source 30 can cure at least one sealant 400 of the substrate assembly 42. The UV spot light source 30 moves with respect to the position of the at least one sealant 400 of the substrate assembly 42, and a width of an irradiation area of the least one UV spot light source 30 irradiating on the substrate assembly 42 is equal to a width of the sealant 400. The UV spot light source 30 is preferably an ultraviolet light emitting diode. Furthermore, in this embodiment, the sealant curing chamber 3 comprises a plurality of UV spot light sources 30 arranged side by side, which move along an identical moving path to irradiate the same sealant 400, wherein a shape of the moving path is corresponding to a shape of the sealant 400.

For example, with reference to FIG. 4, if the substrate assembly 42 has 3×3 of the sealants 400 and liquid crystal areas and the sealant curing chamber 3 comprises three of the UV spot light sources 30, the three of the UV spot light sources 30 firstly move in square along a predetermined moving path to irradiate three of the sealants 400 with respect to the shape of the sealants 400. After finishing the irradiation, the UV spot light sources 30 then irradiate another three of the sealants 400, and so on to irradiate all of the sealants 400 by the same way.

Figure 5:
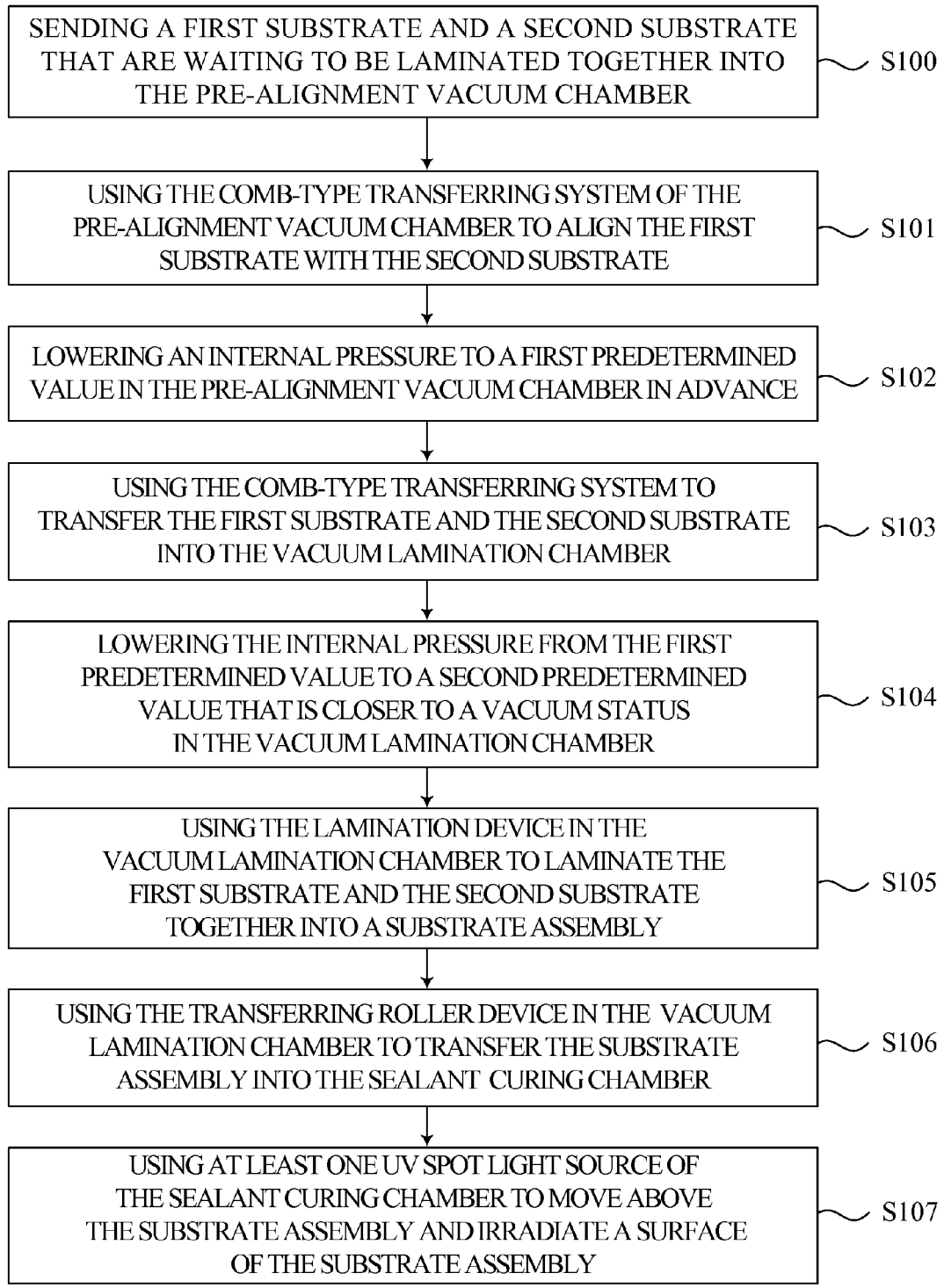
FIG. 5 is a flow chart of a liquid crystal cell manufacturing method according to a preferred embodiment of the present invention.

With reference to FIG. 5, a liquid crystal cell manufacturing method mainly comprises following steps:

S100: sending a first substrate 40 and a second substrate 41 that are waiting to be laminated together into the pre-alignment vacuum chamber 1;

S101: using the comb-type transferring system of the pre-alignment vacuum chamber 1 to align the first substrate 40 with the second substrate 41;

S102: lowering an internal pressure to a first predetermined value in the pre-alignment vacuum chamber 1 in advance;

S103: using the comb-type transferring system to transfer the first substrate 40 and the second substrate 41 into the vacuum lamination chamber 2;

S104: lowering the internal pressure from the first predetermined value to a second predetermined value that is closer to a vacuum status in the vacuum lamination chamber 2;

S105: using the lamination device of the vacuum lamination chamber 2 to laminate the first substrate 40 and the second substrate 41 together into the substrate assembly 42;

S106: using the transferring device 20 of the vacuum lamination chamber 2 to transfer the substrate assembly 42 into the sealant curing chamber 3; and S107: using at least one UV spot light source 30 of the sealant curing chamber 3 to move above the substrate assembly 42 and irradiate a surface of the substrate assembly 42, so as to cure at least one sealants 400 of the substrate assembly 42 with ultraviolet lights.

In the foregoing process, the comb-type transferring system performs alignment and transfer of the substrates. While a substrate is sent to the vacuum lamination chamber 2, the first transferring mechanism 11 (or the second transferring mechanism 12) can simultaneously receive next substrate sent into the pre-alignment vacuum chamber 1 from outside by the alternately-transfer of the first suction-bar assemblies 110A, 110B (or the second suction-bar assemblies). As a result, overall work time can be economized. And the process of transfer to the vacuum lamination chamber 2 does not require robot arms, so that volume of the vacuum lamination chamber 2 can be reduced, and the time spent on pumping air for reducing internal pressure can be reduced as well. Moreover, using the roller-type transferring device to transfer the laminated substrate assembly 42 to the sealant curing chamber 3 is also helpful for accelerating the work and reducing the risk of leakage of liquid crystal. Furthermore, comparing with conventionally using UV lamps that requires a large amount of electricity and maintaining cost, the sealant curing chamber 3 uses the movable UV spot light sources 30 to cure the sealants in the substrate assembly 42 to reduce number of required light sources, reduce manufacture and maintaining cost of sealant curing equipments and economize electricity.

In conclusion, comparing with the existing technology, the present invention integrates devices to be used in vacuum lamination and sealant curing into one unit, wherein the use of the comb-type transferring system and the movable UV spot light sources 30 avoids using robot arms and reduces number of light sources for the overall system. Hence, the present invention reduces overall volumes of device, lowers equipment cost, and also reduce tact time of the substrates of liquid crystal cell.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A liquid crystal cell manufacturing device, characterized in that: the liquid crystal cell manufacturing device comprising:
   a pre-alignment vacuum chamber receiving a first substrate and a second substrate waiting to be laminated together, and lowering an internal pressure to a first predetermined value after receiving the first substrate and the second substrate, wherein the pre-alignment vacuum chamber has a comb-type transferring system, and the comb-type transferring system transfers the first substrate and the second substrate and maintains position alignment between the first substrate and the second substrate, simultaneously;
   a vacuum lamination chamber communicated with the pre-alignment vacuum chamber to receive the first substrate and the second substrate transferred from the pre-alignment vacuum chamber by the comb-type transferring system, lowering the internal pressure from the first predetermined value to a second predetermined value closer to a vacuum status, and having a lamination device and a transferring device, wherein the lamination device laminates the first substrate and the second substrate together into a substrate assembly and the transferring device carries and transfers the substrate assembly; and
   a sealant curing chamber communicated with the vacuum lamination chamber to receive the substrate assembly transferred from the vacuum lamination chamber by the transferring device, so as to cure at least one sealant in the substrate assembly.

2. The liquid crystal cell manufacturing device as claimed in claim 1, characterized in that: the sealant curing chamber includes at least one UV spot light source, and the at least one UV spot light source is disposed on a top of the sealant curing chamber to move above the substrate assembly and irradiate a surface of the substrate assembly, so as to cure the at least one sealant.

3. The liquid crystal cell manufacturing device as claimed in claim 1, characterized in that: the comb-type transferring system includes a first transferring mechanism and a second transferring mechanism, wherein the first transferring mechanism is disposed on a top of the pre-alignment vacuum chamber and has at least two first suction-bar assemblies, wherein each of the at least two first suction-bar assemblies is constructed by a plurality of suction bars, and the suction bars of one of the first suction-bar assemblies and the suction bars of the other of the first suction-bar assemblies are arranged alternately in parallel at intervals; and the second transferring mechanism is disposed on a bottom of the pre-alignment vacuum chamber, corresponds to the first transferring mechanism and has at least two second suction-bar assemblies, wherein each of the at least two second suction-bar assemblies is constructed by a plurality of suction bars, and the suction bars of one of the second suction-bar assemblies and the suction bars of the other of the second suction-bar assemblies are arranged alternately in parallel at intervals.

4. The liquid crystal cell manufacturing device as claimed in claim 3, characterized in that: each of the suction bars has holes formed on two ends thereof, respectively, and has a slot formed on a bottom surface thereof and communicated with the holes, and each of the holes is connected to a suction-pipe.

5. The liquid crystal cell manufacturing device as claimed in claim 1, characterized in that: the first predetermined value of the lowered pressure is 1 Pa, and the second predetermined value thereof is 0.2 Pa.

6. The liquid crystal cell manufacturing device as claimed in claim 2, characterized in that: the at least one UV spot light source moves with respect to the position of the at least one sealant of the substrate assembly.

7. The liquid crystal cell manufacturing device as claimed in claim 6, characterized in that: a width of an irradiation area of the at least one UV spot light source irradiating on the substrate assembly is equal to a width of the sealant.

8. The liquid crystal cell manufacturing device as claimed in claim 7, characterized in that: a width of the sealant is ranged between 0.5 mm and 2 mm.

9. The liquid crystal cell manufacturing device as claimed in claim 1, characterized in that: a vacuum barrier system is mounted between the vacuum lamination chamber and the pre-alignment vacuum chamber, and the vacuum barrier system lowers the pressure from the first predetermined value to the second predetermined value in the vacuum lamination chamber, so as to cut off the communication between the vacuum lamination chamber and the pre-alignment vacuum chamber, so that the vacuum lamination chamber forms an enclosed space.

10. The liquid crystal cell manufacturing device as claimed in claim 2, characterized in that: the sealant curing chamber comprises a plurality of the UV spot light sources arranged side by side that move along an identical moving path to irradiate the same sealant, wherein a shape of the moving path is corresponding to a shape of the sealant.

11. The liquid crystal cell manufacturing device as claimed in claim 1, characterized in that: the transferring device is a roller-type transferring device.

12. A liquid crystal cell manufacturing method, characterized in that: firstly providing a pre-alignment vacuum chamber, a vacuum lamination chamber and a sealant curing chamber, wherein the pre-alignment vacuum chamber includes a comb-type transferring system, the vacuum lamination chamber includes a lamination device and a transferring device, and the sealant curing chamber includes at least one UV spot light source, and the liquid crystal cell manufacturing method further comprises steps of: sending a first substrate and a second substrate waiting to be laminated together into the pre-alignment vacuum chamber; using the comb-type transferring system of the pre-alignment vacuum chamber to align the first substrate with the second substrate; lowering an internal pressure to a first predetermined value in the pre-alignment vacuum chamber in advance; using the comb-type transferring system to transfer the first substrate and the second substrate into the vacuum lamination chamber; lowering the internal pressure from the first predetermined value to a second predetermined value that is closer to a vacuum status in the vacuum lamination chamber; using the lamination device in the vacuum lamination chamber to laminate the first substrate and the second substrate together into a substrate assembly; using the transferring device in the vacuum lamination chamber to transfer the substrate assembly into the sealant curing chamber; and curing at least one sealant of the substrate assembly in the sealant curing chamber.

13. The liquid crystal cell manufacturing method as claimed in claim 12, characterized in that: the sealant curing chamber uses at least one UV spot light source to move above the substrate assembly and irradiate a surface of the substrate assembly, so as to cure the at least one sealant of the substrate assembly.

14. The liquid crystal cell manufacturing method as claimed in claim 12, characterized in that: the comb-type transferring system includes a first transferring mechanism and a second transferring mechanism, wherein the first transferring mechanism is disposed on a top of the pre-alignment vacuum chamber and has at least two first suction-bar assemblies, wherein each of the at least two first suction-bar assemblies is constructed by a plurality of suction bars, and the suction bars of one of the first suction-bar assemblies and the suction bars of the other of the first suction-bar assemblies are arranged alternately in parallel at intervals; and the second transferring mechanism is disposed on a bottom of the pre-alignment vacuum chamber, corresponds to the first transferring mechanism and has at least two second suction-bar assemblies, wherein each of the at least two second suction-bar assemblies is constructed by a plurality of suction bars, and the suction bars of one of the second suction-bar assemblies and the suction bars of the other of the second suction-bar assemblies are arranged alternately in parallel at intervals.

15. The liquid crystal cell manufacturing method as claimed in claim 14, characterized in that: each of the suction bars has holes formed on two ends thereof, respectively, and has a slot formed on a bottom surface thereof and communicated with the holes, and each of the holes is connected to a suction-pipe.

16. The liquid crystal cell manufacturing method as claimed in claim 12, characterized in that: a width of the sealant is ranged between 0.5 mm and 2 mm.

17. The liquid crystal cell manufacturing method as claimed in claim 13, characterized in that: the at least one UV spot light source moves with respect to the position of the at least one sealant of the substrate assembly, and a width of an irradiation area of the at least one UV spot light source irradiating on the substrate assembly is equal to a width of the sealant.

18. The liquid crystal cell manufacturing method as claimed in claim 17, characterized in that: a width of the sealant is ranged between 0.5 mm and 2 mm.

19. The liquid crystal cell manufacturing method as claimed in claim 12, characterized in that: the transferring device is concealed in a bottom of the vacuum lamination chamber, and is raised to a predetermined position after the first substrate and the second substrate are laminated into the substrate assembly and the pressure is released as the normal pressure, so as to carry and transfer the substrate assembly.

20. A liquid crystal cell manufacturing device, characterized in that: the liquid crystal cell manufacturing device comprising:
a vacuum lamination chamber receiving a first substrate and a second substrate, lowering an internal pressure to a second predetermined value close to a vacuum status and having a lamination device and a roller-type transferring device, wherein the lamination device laminates the first substrate and the second substrate together into a substrate assembly and the roller-type transferring device carries and transfers the substrate assembly; and a sealant curing chamber communicated with the vacuum lamination chamber to receive the substrate assembly transferred from the vacuum lamination chamber by the roller-type transferring device and having at least one UV spot light source, wherein the at least one UV spot light source is disposed on a top of the sealant curing chamber to move above the substrate assembly and irradiate a surface of the substrate assembly, so as to cure at least one sealant of the substrate assembly.

\* \* \* \* \*